United States Patent
Chien

(10) Patent No.: US 9,692,724 B2
(45) Date of Patent: Jun. 27, 2017

(54) NETWORK CONNECTION STATUS DETECTION SYSTEM AND METHOD THEREOF

(75) Inventor: Huang-Jen Chien, New Taipei (TW)

(73) Assignee: AV Tech Corporation, New Taipei (TW)

( * ) Notice: Subject to any disclaimer, the term of this patent is extended or adjusted under 35 U.S.C. 154(b) by 894 days.

(21) Appl. No.: 13/331,573

(22) Filed: Dec. 20, 2011

(65) Prior Publication Data
US 2013/0091272 A1    Apr. 11, 2013

(30) Foreign Application Priority Data

Oct. 6, 2011   (TW) .............................. 100136370 A

(51) Int. Cl.
| | | |
|---|---|---|
| G06F 15/173 | (2006.01) | |
| H04L 29/12 | (2006.01) | |
| G06F 15/16 | (2006.01) | |
| H04L 12/741 | (2013.01) | |

(52) U.S. Cl.
CPC ...... H04L 61/2514 (2013.01); H04L 61/2517 (2013.01); *G06F 15/16* (2013.01); *H04L 45/74* (2013.01); *H04L 61/2567* (2013.01)

(58) Field of Classification Search
None
See application file for complete search history.

(56) References Cited

U.S. PATENT DOCUMENTS

| | | | | |
|---|---|---|---|---|
| 6,886,027 | B2 * | 4/2005 | Tajiri | H04L 29/06027 370/351 |
| 7,243,141 | B2 * | 7/2007 | Harris | H04L 12/2697 463/40 |
| 8,086,740 | B2 * | 12/2011 | Tyukasz | H04L 63/029 709/227 |
| 2003/0172136 | A1 * | 9/2003 | Katagawa | G06F 9/547 709/220 |

(Continued)

FOREIGN PATENT DOCUMENTS

CN     101273337 A     9/2008

OTHER PUBLICATIONS

Office Action of corresponding TW application, published on Jul. 23, 2014.

*Primary Examiner* — Viet Vu
*Assistant Examiner* — James Edwards
(74) *Attorney, Agent, or Firm* — Wang Law Firm, Inc.

(57) ABSTRACT

A network connection status detection system and method thereof. The system comprises a network address translation (NAT) router, a server end and at least one network electronic device. The NAT router is a bridge for communicating an intranet with an extranet. The server end is disposed at the extranet and connected to the NAT router through a network. The network electronic device is disposed at the intranet and connected to the NAT router. When a channel is established between the network electronic device and the NAT router by executing a connection configuration so that the network electronic device connects to the server end, the network (Continued)

electronic device sends a connection detection signal to the server end. If the server end receives the connection detection signal and returns a confirmation signal, an indicator of the network electronic device will remind a user in a predetermined way.

7 Claims, 3 Drawing Sheets

(56) References Cited

U.S. PATENT DOCUMENTS

| | | | | |
|---|---|---|---|---|
| 2003/0212772 | A1* | 11/2003 | Harris | H04L 12/2697 |
| | | | | 709/220 |
| 2005/0114496 | A1 | 5/2005 | Fang | |
| 2007/0110054 | A1* | 5/2007 | Kozakai | H04L 29/12367 |
| | | | | 370/389 |
| 2007/0128899 | A1* | 6/2007 | Mayer | G06F 9/4406 |
| | | | | 439/152 |
| 2007/0217408 | A1* | 9/2007 | Sahashi | H04L 29/12103 |
| | | | | 370/389 |
| 2008/0034123 | A1* | 2/2008 | Hirao | H04L 41/08 |
| | | | | 709/253 |
| 2008/0072289 | A1* | 3/2008 | Aoki | H04L 43/0811 |
| | | | | 726/3 |
| 2008/0177994 | A1* | 7/2008 | Mayer | G06F 9/4418 |
| | | | | 713/2 |
| 2008/0180524 | A1* | 7/2008 | Lin | H04N 5/232 |
| | | | | 348/143 |
| 2008/0279164 | A1* | 11/2008 | Wu | H04W 48/16 |
| | | | | 370/338 |
| 2009/0106394 | A1* | 4/2009 | Lin | H04L 29/125 |
| | | | | 709/218 |
| 2009/0151006 | A1* | 6/2009 | Saeki | G06F 21/10 |
| | | | | 726/28 |
| 2009/0207905 | A1* | 8/2009 | Tomita | H04L 29/12066 |
| | | | | 375/240.01 |
| 2009/0265443 | A1* | 10/2009 | Moribe | G06F 15/16 |
| | | | | 709/217 |
| 2009/0323559 | A1* | 12/2009 | Chen | H04L 29/12377 |
| | | | | 370/259 |
| 2010/0013918 | A1* | 1/2010 | Ta' Eed | H04N 1/00106 |
| | | | | 348/143 |
| 2010/0217837 | A1* | 8/2010 | Ansari | G06Q 30/04 |
| | | | | 709/218 |
| 2010/0332626 | A1* | 12/2010 | Jonsson | H04L 29/1282 |
| | | | | 709/220 |
| 2011/0134241 | A1* | 6/2011 | Weissman | H04N 7/181 |
| | | | | 348/143 |
| 2011/0283151 | A1* | 11/2011 | Kaneko | H04L 41/06 |
| | | | | 714/43 |
| 2012/0042358 | A1* | 2/2012 | Kondur | G06F 21/316 |
| | | | | 726/3 |
| 2012/0281707 | A1* | 11/2012 | Muhanna | H04L 61/2575 |
| | | | | 370/401 |
| 2012/0290689 | A1* | 11/2012 | Beguelin | H04L 67/125 |
| | | | | 709/220 |
| 2012/0324567 | A1* | 12/2012 | Couto | H04L 41/0853 |
| | | | | 726/12 |

* cited by examiner

NETWORK CONNECTION STATUS DETECTION SYSTEM AND METHOD THEREOF

CROSS-REFERENCE TO RELATED APPLICATION

This application claims the benefit of priority to Taiwan Patent Application No. 100136370, filed on Oct. 6, 2011, in the Taiwan Intellectual Property Office, the disclosure of which is incorporated herein in its entirety by reference.

BACKGROUND OF THE INVENTION

1. Field of the Invention

The present invention relates to a network connection status detection system and a method thereof, in particular to the network connection status detection system and method thereof that the user can know whether or not the network electronic device is connected to a remote server properly in real time when a user installs a network electronic device.

2. Description of the Related Art

As science and technology advance, various electronic devices can be connected to a remote server via a network to obtain more convenient and diversified services and information immediately. For example, webcams have been used extensively in offices, childcare centers or many other occasions in our daily life, providing users for performing image capturing operations such as conducting a video conference, providing parents to watch the activities of their children anytime or monitoring the safety of their home at remote ends via networks. In general, a router is used for connecting the Internet to achieve an advantage that several devices are online simultaneously, but it also causes other problems. Wherein, one of the common problems regards the servo service of a network electronic device set up under the router is that how to make the users know whether or not a network electronic device under the router may have been accessed through a third-party user.

As to webcams, if a user installs a webcam for the first time and wants to connect the webcam to a server of an extranet through a network, the user has to configure connection configurations of the network through a router first. After related network parameters are obtained and filled into installation settings of the webcam, a configuration of the installation setting is completed. However, the network parameters and the connection configurations for the installation are complicated. Even though each the parameters has been filled in and the network connection configuration of the webcam has been done, the user still do not know whether he or she has completed the installation setting correctly and do not know for sure whether the webcam has been properly connected to a server of an extranet via a network. Obviously, the prior art requires improvements.

SUMMARY OF THE INVENTION

In view of the aforementioned problem of the prior art, it is a primary objective of the present invention to provide a network connection status detection system and a method thereof to overcome the problem of unable to know whether or not a device has been connected to a router correctly through a third party, when a network electronic device (such as a webcam) installed to a router.

To achieve the foregoing objective, the present invention provides a network connection status detection system comprising a network address translation (NAT) router, a server end and at least one network electronic device. The NAT router serves as a bridge for communicating an intranet with an extranet. A server end is installed at the extranet and connected to the NAT router through a network. At least one network electronic devices are installed at the intranet and connected to the NAT router. Wherein, when a connection configuration is requested to establish a channel between the network electronic device and the NAT router, the network electronic device can be connected to the server end. The network electronic device sends a connection detection signal, which includes NAT port number information that is used for going through the NAT router. If the server end receives the connection detection signal, the server end will try to use the NAT port number information that the network electronic device sent to go through the NAT router to reach the network electronic device. If the network electronic device receives the signal from the server end in time, an indicator of the network electronic device will issue a reminding signal in a predetermined way.

Preferably, the network electronic device sends the connection detection signal to the server end periodically in a predetermined time interval to perform a network connection status detection of the network electronic device.

Preferably, the network electronic device is a webcam.

Preferably, when the network electronic device receives the confirmation signal, the reminding signal is observable to the user.

Preferably, the reminding signal is a light signal, a sound or a combination thereof.

Preferably, the network electronic device is connected to the NAT router with a wire or wireless.

Preferably, the network connection status detection system of the present invention further comprises a universal plug and play (UPNP) for performing the connection configuration automatically to establish a channel when the network electronic device and the NAT router are connected.

To achieve the foregoing objective, the present invention provides a network connection status detection method applicable for detecting a connection status between at least one network electronic device and a server end, comprising the steps of: using a network address translation (NAT) router to connect the server end situated at an extranet through a network; connecting the network electronic device situated at an intranet to the NAT router; performing a connection configuration to establish a channel between the network electronic device and the NAT router, such that the network electronic device is connected to the server end; and sending a connection detection signal from the network electronic device to the server end; if the server end receives the connection detection signal and returns a confirmation signal, an indicator of the network electronic device issues a reminding signal to the user in a predetermined way.

Preferably, the reminding signal is a light on, a light off or a sound.

In summation, in the network connection status detection system and method thereof of the present invention, when a user installs the webcam or the network electronic device, the user would know whether or not the webcam or network electronic device installed and set up by self is connected properly to a server end of an extranet through a light signal, a sound or other ways observable by the user. Therefore, the user can instantly know whether or not a webcam or a network electronic device is installed correctly to provide a convenient application.

DETAILED DESCRIPTION OF THE PREFERRED EMBODIMENTS

The technical characteristics of the present invention will become apparent with the detailed description of the preferred embodiments accompanied with the illustration of related drawings as follows. It is noteworthy to point out that same numerals are used for representing respective elements for the description of the preferred embodiments and the illustration of the drawings.

Figure 1:
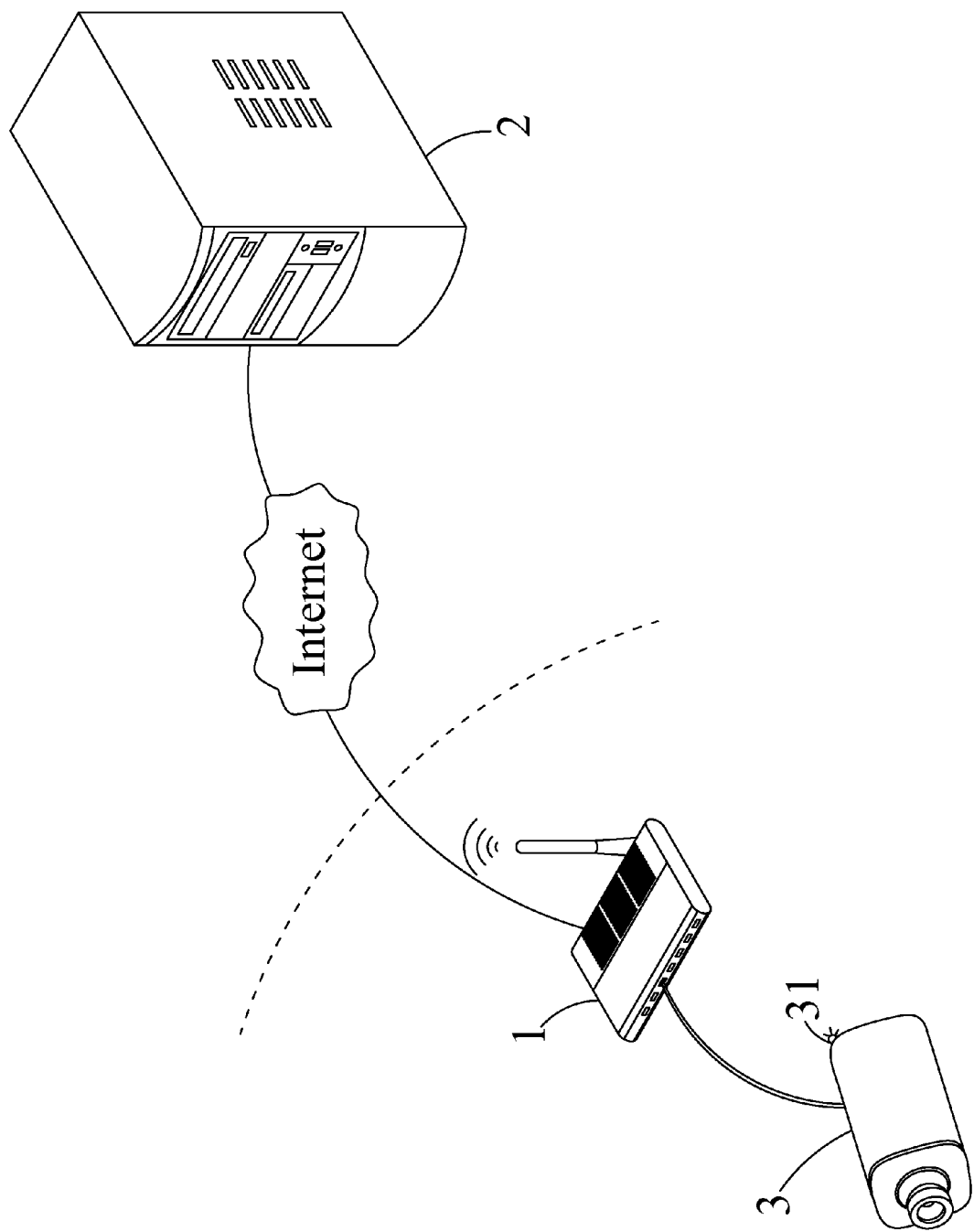
FIG. 1 is a schematic view of a network connection status detection system in accordance with a first preferred embodiment of the present invention.

With reference to FIG. 1 for a schematic view of a network connection status detection system in accordance with a first preferred embodiment of the present invention, the network connection status detection system comprises a network address translation (NAT) router 1, a server end 2 and at least one webcam 3. The NAT router 1 is a bridge for communicating an intranet with an extranet. The server end 2 is installed at the extranet and communicated with the NAT router 1 via the Internet. The webcam 3 is the network electronic device of the present invention, which may be any other device connected to the network. The webcam 3 is used as an example in a preferred embodiment, but the invention is not limited to webcams only. The webcam 3 is installed at the intranet and electrically coupled to the NAT router 1 with a wire or wireless. The webcam 3 further comprises an indicator 31, which can be a light emitting device, a speaker or their combination.

In the first preferred embodiment, if a user wants to install a webcam 3 and connect the webcam 3 to a server end 2 of an extranet, a connection configuration may be requested on the webcam 3 to establish a channel between the webcam 3 and a NAT router 1. The connection configuration can be inputted manually by the user or set up automatically by a universal plug and play (UPNP), wherein the connection configuration comprises the setting of virtual addresses, ports, etc. Wherein, when the channel is established between the webcam 3 and the NAT router 1 so that the webcam 3 is connected to the server end 2 of an extranet, the webcam 3 sends a connection detection signal, which includes NAT port number information that is used for going through the NAT router 1, to the server end 2. After the server end 2 receives the connection detection signal, the server end 2 will try to returns a confirmation signal to the webcam 3 by using the NAT port number information that the webcam 3 sent to go through the NAT router 1 to reach the webcam 3. Thus, the user is reminded about the webcam 3 being installed correctly and connected to the server end 2 of the extranet properly by an indicator 31 of the webcam 3 in a predetermined way. If the indicator 31 is a light emitting device, a light-up or a light-off signal will be sent out as a reminding signal to remind the user. If the indicator 31 is a speaker, a sound will be used to remind the user, or both the light signal and the sound are used at the same time to remind the user.

Figure 2:
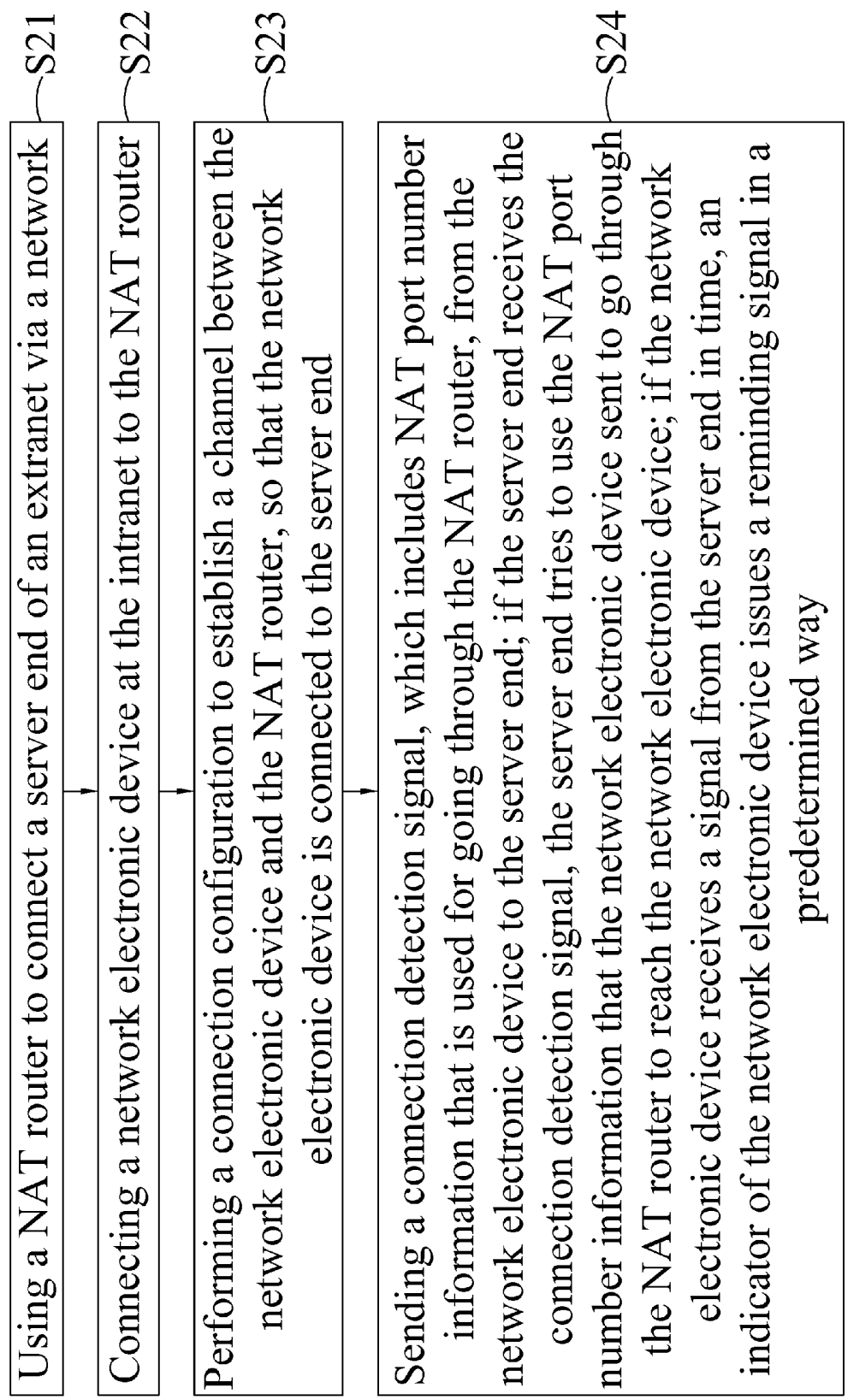
FIG. 2 is a flow chart of a network connection status detection method of the present invention.

With reference to FIG. 2 for a flow chart of network connection status detection method of the present invention, the method comprises the following steps: S21: Use a NAT router to connect a server end of an extranet via a network. S22: Connect a network electronic device at the intranet to the NAT router. S23: Perform a connection configuration to establish a channel between the network electronic device and the NAT router, so that the network electronic device is connected to the server end. S24: Send a connection detection signal from the network electronic device to the server end; if the server end receives the connection detection signal and returns a confirmation signal, a user will be reminded by an indicator of the network electronic device in a predetermined way.

Figure 3:
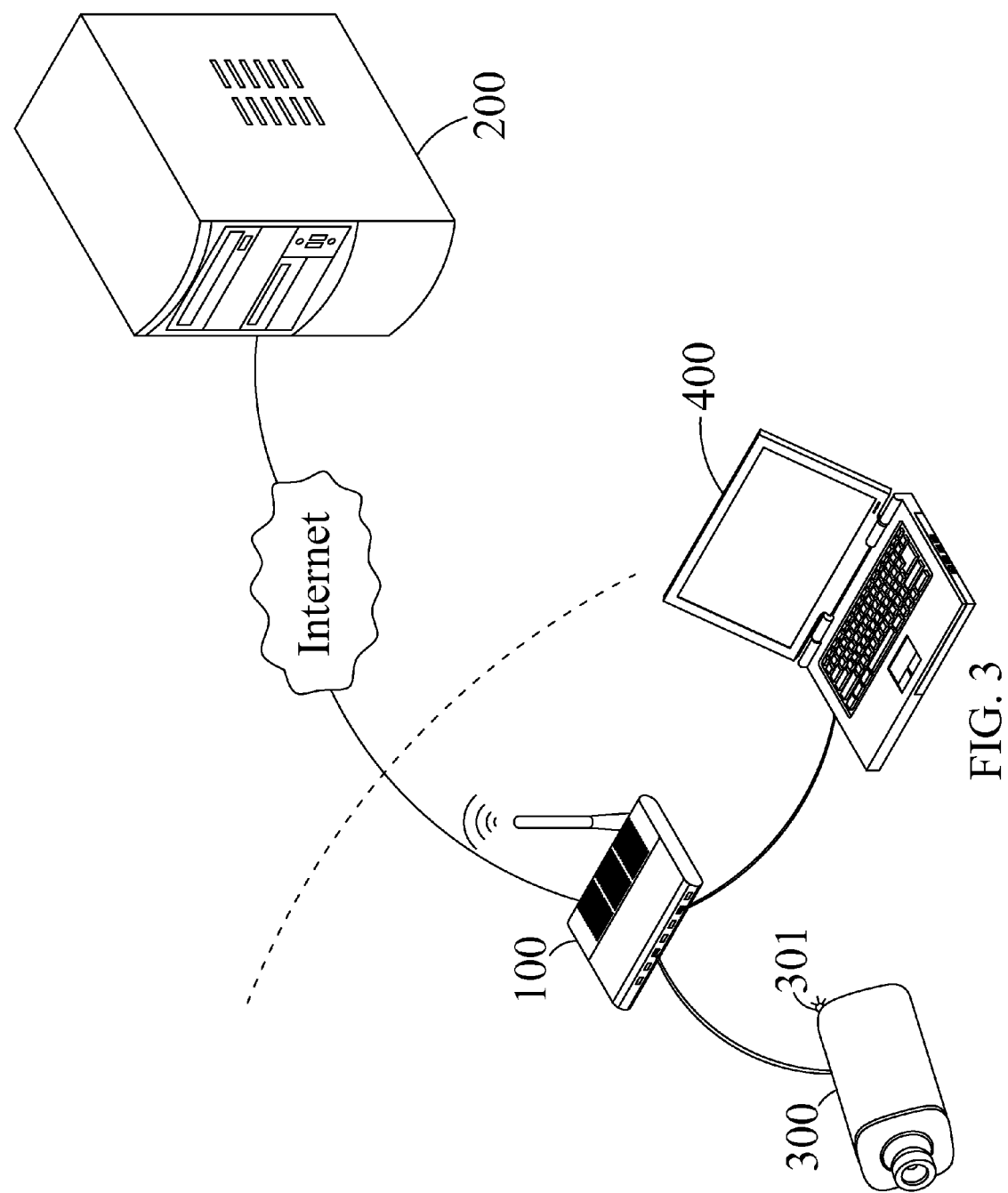
FIG. 3 is a schematic view of a network connection status detection system in accordance with a second preferred embodiment of the present invention.

With reference to FIG. 3 for a schematic view of a network connection status detection system in accordance with the second preferred embodiment of the present invention, the network connection status detection system comprises a network address translation (NAT) router 100, a server end 200, a webcam 300 and a host system 400, wherein the webcam 300 includes an indicator 301, which can be a light emitting device, a speaker, etc. The server end 200 is disposed at an extranet and connected to the NAT router 100 via the Internet. The NAT router 100, webcam 300 and host system 400 are disposed at an intranet, and webcam 300 and the host system 400 are coupled to the NAT router 100 with wire or wireless.

In the second preferred embodiment, when the user installs the webcam 300, a channel may be established between the webcam 300 and the NAT router 100 manually or automatically by the UPNP, so that the webcam 300 can be connected to the server end 200. The host system 400 is connected to the webcam 300 through a connection configuration of the intranet. After a channel has been established between the webcam 300 and the NAT router 100, the webcam 300 sends a connection detection signal, which includes NAT port number information that is used for going through the NAT router 100, to the server end 200. After the server end 200 receives the connection detection signal, the server end 200 will try to returns a confirmation signal by using the NAT port number information that the webcam 300 sent to go through the NAT router 100 to reach the webcam 300. Thus, the user is reminded by the indicator 301 of the webcam 300 through a light, a sound or a combination thereof and informed about the webcam 300 being installed correctly for transmitting data to the server end 200. If the indicator 301 has originally turned on the light, the light signal of the indicator 301 was switched from ON to OFF when the webcam 300 is installed successfully to remind the user. When the webcam 300 receives the confirmation signal returned from the server end 200, a webpage or content information is also generated by the host system 400 to display the information that the webcam 300 has been installed successfully.

In summation, in the network connection status detection system and method thereof of the present invention, when a user installs a network electronic device such as a webcam, the user would know about the situation of installation. When the network electronic device is installed and connected to a server end successfully, the user can know about the aforementioned situation through an indicator or display screen to have a more convenient application.

In summation of the description above, the present invention breaks through the prior art, achieve the expected improved effects, and complies with patent application requirements, and is thus duly filed for patent application.

While the invention has been described by means of specific embodiments, numerous modifications and variations could be made thereto by those skilled in the art without departing from the scope and spirit of the invention set forth in the claims.

What is claimed is:

1. A network connection status detection system, comprising:

a network address translation (NAT) router, serving as a bridge for communicating an intranet with an extranet;

a server, installed at the extranet and connected to the NAT router through a network;

a network electronic device, installed at the intranet and connected to the NAT router; and a host system, installed at the intranet and connected to the NAT router, and connected to the at least one network electronic device through a connection configuration of the intranet, wherein, when a communication channel is established between the network electronic device and the NAT router, the network electronic device spontaneously sends a connection detection signal to the server, the connection detection signal including NAT port number information that is used for going through the NAT router, and when the server receives the connection detection signal, the server sends a confirmation signal in response to the connection detection signal according to the NAT port number information, and when the network electronic device receives the confirmation signal from the server, an indicator of the network electronic device issues a reminding signal, and wherein when the network electronic device receives the confirmation signal from the server, a webpage or content information is generated by the host system for confirming the network electronic device is connected to the server through the NAT router successfully, the network electronic device sends the connection detection signal to the server periodically in a predetermined time interval to perform a network connection status detection of the network electronic device, when the network electronic device receives the confirmation signal, the reminding signal is observable to the user, and the reminding signal is a light signal, a sound or a combination thereof.

2. The network connection status detection system of claim 1, wherein the network electronic device is a webcam.

3. The network connection status detection system of claim 1, wherein the network electronic device is connected to the NAT router with a wire or wirelessly.

4. The network connection status detection system of claim 1, further comprising a universal plug and play (UPNP) for performing the connection configuration automatically to establish the channel when the network electronic device and the NAT router are connected.

5. A network connection status detection method, applicable for detecting a connection status between a network electronic device and a server, comprising steps of:

using a network address translation (NAT) router to connect the server situated at an extranet through a network;

connecting the network electronic device and a host system situated at an intranet to the NAT router, wherein the host system is connected to the network electronic device through a connection configuration of the intranet;

performing a connection configuration to establish a communication channel between the network electronic device and the NAT router sending a connection detection signal spontaneously by the network electronic device to the server, the connection detection signal including NAT port number information used for going through the NAT router;

sending a confirming signal by the server to the network electronic device in response to the connection detection signal according to the NAT port number information; and using the network electronic device to send the connection detection signal to the server periodically in a predetermined time interval to perform a network connection status detection of the network electronic device, wherein when the network electronic device receives the confirmation signal from the server, the network electronic device issues a reminding signal observable to the user, the reminding signal is a light on, a light off or a sound, and the host system generates a webpage or content information to display for confirming the network electronic device is connected to the server through the NAT router successfully.

6. The network connection status detection method of claim 5, further comprising a step of:

using a universal plug and play (UPNP) to perform the connection configuration automatically to establish the channel when the network electronic device and the NAT router are connected.

7. A network connection status detection system, comprising:

a network address translation (NAT) router, serving as a bridge for communicating an intranet with an extranet;

a server, installed at the extranet and connected to the NAT router through a network; and a network electronic device, installed at the intranet and connected to the NAT router;

wherein, upon establishment of a communication channel between the network electronic device and the NAT router, the network electronic device initiates sending of a connection detection signal to the server, the connection detection signal including NAT port number information that is used for going through the NAT router, and when the server receives the connection detection signal, the server sends a confirmation signal in response to the connection detection signal according to the NAT port number information, and when the network electronic device receives the confirmation signal from the server, an indicator of the network electronic device issues a reminding signal, the network electronic device sends the connection detection signal to the server periodically in a predetermined time interval to perform a network connection status detection of the network electronic device, the network electronic device receives the confirmation signal from the server, the network electronic device issues a reminding signal observable to the user, the reminding signal is a light on, a light off or a sound, and the network electronic device generates a webpage or content information to display for confirming the network electronic device is connected to the server through the NAT router successfully.

* * * * *